(12) United States Patent
Stratton

(10) Patent No.: US 6,805,162 B2
(45) Date of Patent: Oct. 19, 2004

(54) EROSION REDUCING VALVE PLUG AND SEAT RING

(75) Inventor: Laurence R. Stratton, Anaheim, CA (US)

(73) Assignee: Control Components, Inc., Rancho Santa Margarita, CA (US)

(*) Notice: Subject to any disclaimer, the term of this patent is extended or adjusted under 35 U.S.C. 154(b) by 125 days.

(21) Appl. No.: 10/316,429

(22) Filed: Dec. 11, 2002

(65) Prior Publication Data

US 2004/0031527 A1 Feb. 19, 2004

Related U.S. Application Data

(60) Provisional application No. 60/403,768, filed on Aug. 15, 2002.

(51) Int. Cl.[7] ............................................... F16K 11/07
(52) U.S. Cl. ................................................. 137/625.37
(58) Field of Search ........................ 137/625.3, 625.37, 137/625.38, 625.39; 251/118

(56) References Cited

U.S. PATENT DOCUMENTS

| | | | | |
|---|---|---|---|---|
| 3,704,726 A | * | 12/1972 | Lewis | ..................... 137/625.3 |
| 4,569,370 A | * | 2/1986 | Witt | ......................... 137/625.3 |
| 5,090,450 A | * | 2/1992 | Pelech et al. | ............. 137/625.3 |
| 5,503,184 A | * | 4/1996 | Reinartz et al. | ......... 137/625.3 |
| 5,964,248 A | * | 10/1999 | Enarson et al. | ........ 137/625.39 |
| 6,637,452 B1 | * | 10/2003 | Alman | .................. 137/625.37 |

* cited by examiner

*Primary Examiner*—John Fox
(74) *Attorney, Agent, or Firm*—Stetina Brunda Garred & Brucker

(57) ABSTRACT

A valve arrangement comprises a valve housing, a valve seat and a valve plug. The valve housing defines an interior chamber and a flow opening for respectively receiving and discharging fluid. The seat ring is engaged to the valve housing and defines an angled seating surface and a spaced pair of channels positioned between the seating surface and the valve housing. The valve plug is axially slidable within the interior chamber and defines a valve plug seating surface configured at an angle complementary to that of the seat ring seating surface for creating a fluid-tight surface-to-surface seal. The valve plug further defines a spaced pair of projections configured to cooperate with respective ones of the channels such that disengagement of the valve plug seating surface from the seat ring seating surface defines a tortuous fluid path for reducing the velocity of the fluid flowing therethrough.

11 Claims, 2 Drawing Sheets

EROSION REDUCING VALVE PLUG AND SEAT RING

CROSS-REFERENCE TO RELATED APPLICATIONS

The present application claims priority to U.S. Provisional Application No. 60/403,768 entitled EROSION REDUCING VALVE PLUG AND SEAT RING filed Aug. 15, 2002.

STATEMENT RE: FEDERALLY SPONSORED RESEARCH/DEVELOPMENT (Not Applicable)

BACKGROUND OF THE INVENTION

The present invention relates generally to valves, and more particularly to a uniquely configured valve plug and corresponding seat ring which are specifically configured to mitigate the erosive effects of abrasive fluids flowing within a valve employing linear motion valve trim.

There is currently known in the prior art valves which include shafts and plugs that are linearly displaced during normal operation of the valve. Within these valves, which are often referred to as linear displacement valves, the plug is disposed and movable within a disk stack or valve cage which defines a multiplicity of tortuous or non-tortuous fluid passageways. Certain linear displacement valves are configured for "over plug flow" wherein fluid flows radially inward into the interior of the valve cage from the exterior thereof, with the fluid undergoing a pressure drop as a result of the flow through the valve cage. In this arrangement, the valve is opened by lifting the plug off a seat ring which thus allows the fluid to flow from the interior of the valve cage and out of the valve via the unblocked seat ring. Conversely, the movement of the seating surface of the plug into sealed engagement with the complementary seating surface of the seat ring facilitates a closed or shut-off condition for the valve.

Over plug flow linear displacement valves are sometimes employed in applications wherein an erosive fluid (e.g., water with abrasive sand) is channeled therethrough. In these particular applications, when the erosive fluid flows from the outside of the valve cage to the inside thereof and exits the fluid passageways defined by the valve cage, the resultant jets erode the seating surface on the plug. When the eroded plug's seating angle (defined by its seating surface) makes contact with the seating angle on the seat ring (also defined by its seating surface), valve shut-off is compromised and leakage occurs. The constant leakage of the erosive or abrasive fluid further accelerates the erosion damage between the seat ring and the seating surface of the plug.

The present invention specifically addresses the above-described erosion damage problem by providing a valve plug and seat ring with unique, complementary configurations specifically adapted to either slow the erosive fluid as it passes over the seating surfaces of the plug and seat ring, or alternatively, prevent the fluid jets exiting the valve cage from directly impinging the seating surface of the plug. These, and other features of the present invention, will be described below.

BRIEF SUMMARY OF THE INVENTION

The valve arrangement of the present invention comprises a valve housing, a valve seat and a valve plug. The valve housing defines an interior chamber and a flow opening fluidly communicating with the interior chamber. The interior chamber receives the fluid therein and the flow opening allows the fluid to escape the interior chamber. The seat ring is partially engaged to the valve housing at the flow opening and defines an angled seating surface formed around the seat ring. The seat ring further defines a spaced pair of channels positioned between the seating surface and that portion engaged to the valve housing. The valve plug is axially slidably disposed within the interior chamber and defines a valve plug seating surface and an outer surface. The valve plug seating surface is configured at an angle complementary to that of the seat ring seating surface such that direct engagement of the valve plug seating surface with the seat ring seating surface creates a fluid-tight surface-to-surface seal.

The valve plug further defines a spaced pair of projections positioned between the valve plug seating surface and the outer surface of the valve plug. In a first embodiment, the outer surface partially defines the outer projection. The pair of projections cooperate with respective ones of the channels such that disengagement of the valve plug seating surface from the seat ring seating surface defines a tortuous fluid path. Importantly, the tortuous fluid path reduces the velocity of the fluid as it flows radially inward from the interior housing toward the seating surface of the valve plug prior to its discharge out of the valve arrangement. The reduction in fluidly velocity mitigates erosion of the seating surface of the valve plug by the fluid, thereby minimizing or eliminating the risk of leakage of the valve arrangement when in the closed position.

In the first embodiment, the channels and the projections may each be configured such that the tortuous fluid path defines eight substantially right-angled turns prior to reaching the valve plug seating surface. In a second embodiment, the valve plug seating surface is recessed upwardly into the valve plug relative to the channels. The seat ring seating surface is also disposed upwardly in a complementary orientation to the valve plug seating surface so as to be engageable to the valve plug seating surface. The upwardly disposed seating surfaces prevent direct impingement of the fluid upon the valve plug seating surface when the valve plug is disengaged from the seat ring and the fluid flows radially inward along the tortuous fluid path.

The upwardly disposed seating surfaces further mitigate the erosive effects of the fluid upon the valve plug seating surface in combination with the reduction in erosion effected by the velocity-reducing tortuous fluid path. Additionally, in the second embodiment, the outer one of the pair of projections is spaced inwardly from the outer surface of the valve plug such that the tortuous fluid path defines ten substantially right-angled turns prior to reaching the valve plug seating surface. The increased number of turns of the second embodiment results in an increase in the fluid frictional force within the tortuous fluid path such that the velocity of the fluid may be further reduced.

BRIEF DESCRIPTION OF THE DRAWINGS

These, as well as other features of the present invention, will become more apparent upon reference to the drawings wherein.

DETAILED DESCRIPTION OF THE INVENTION

Figure 1:
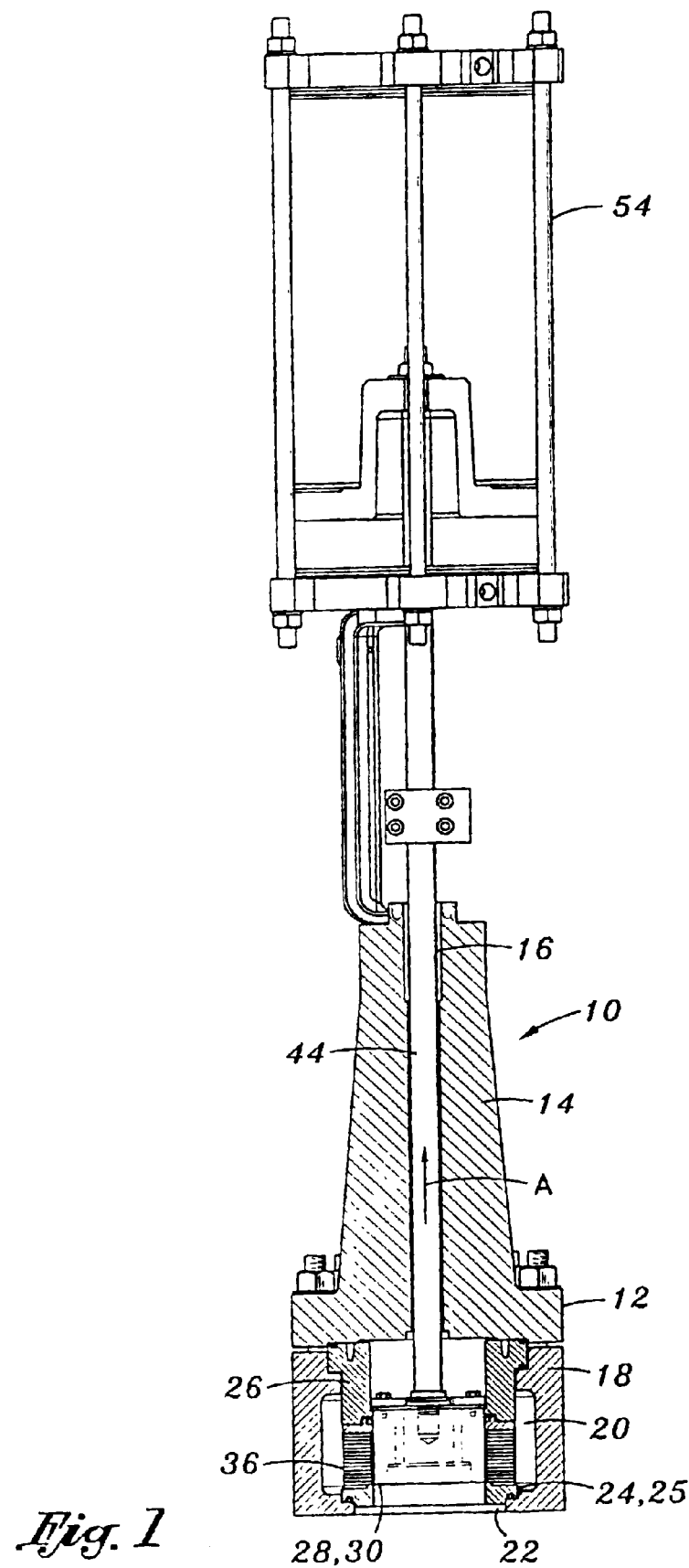
FIG. 1 is a partial cross-sectional view of a valve arrangement in which the valve plug and seat ring of the present invention may be employed.

Referring now to the drawings wherein the showings are for purposes of illustrating preferred embodiments of the present invention only, and not for purposes of limiting the same, FIG. 1 illustrates an exemplary valve arrangement 10 in which a valve plug and complementary seat ring of the present invention described below may be employed. The valve arrangement 10 comprises a valve housing 12 which includes an upper section 14 having an elongate bore 16 extending axially therethrough. Bolted to the upper section 14 is a lower section 18 which defines an interior chamber 20 and a flow opening 22 which fluidly communicates with the interior chamber 20. The valve housing 12 further includes a seat ring which is cooperatively engaged to the lower section 18 and at least partially disposed within the flow opening 22. As will be discussed in more detail below, the seat ring may comprise either the seat ring 24 of the first embodiment shown in FIG. 2, or the seat ring 25 of the second embodiment shown in FIG. 3.

Also included in the valve housing 12 is an annular sleeve 26 which is disposed within the interior chamber 20. Also disposed within the interior chamber 20 is an annular valve cage 36 which is captured between the sleeve 26 and the seat ring.

In addition to the valve housing 12, the valve arrangement 10 includes a generally cylindrical valve plug. The valve plug may comprise the valve plug 28 of the first embodiment shown in FIG. 2, or the valve plug 30 of the second embodiment shown in FIG. 3. As will also be discussed in more detail below, the valve plug 28 and seat ring 24 of the first embodiment are configured for use in conjunction with each other. Similarly, the valve plug 30 and seat ring 26 of the second embodiment are configured for use in conjunction with each other. Attached to and extending axially from one end of the valve plug is an elongate shaft or rod 44 which is advanced through the bore 16 within the upper section 14 of the valve housing 12. As will be described in more detail below, the end of the valve plug opposite that including the rod 44 extending therefrom defines a seating angle or seating surface, with the seat ring itself defining a seating angle or seating surface.

In the valve arrangement 10, the rod 44 is coupled to an actuator 54 which is operative to reciprocally move the valve plug between a closed position (shown in FIG. 1) and an open position. Though the actuator 54 is shown in FIG. 1 as being a piston actuator, the same may comprise any type of actuator (e.g., manual handwheel, air diaphragm, electric, hydraulic). Movement of the valve plug to the open position occurs as a result of the movement of the rod 44 in the direction shown by the arrow A in FIG. 1. As will be recognized, upon the movement of the valve plug to its open position, the same may be selectively returned to its closed position by the movement of the rod 44 in a direction opposite the direction designated by the arrow A.

When the valve plug is in its closed position, the seating surface defined thereby is seated against the complementary seating surface defined by the seat ring. The engagement of the valve plug to the seat ring effectively blocks the flow of fluid out of the interior of the valve cage 36. As indicated above, in the over plug flow arrangement, fluid flows into the interior chamber 20, and thereafter radially through the valve cage 36 from the exterior to the interior thereof. The fluid flowing into the interior of the valve cage 36 undergoes a pressure drop as a result of flow through the tortuous or non-tortuous fluid passageways defined by the valve cage 36. When the valve plug is moved from its closed position toward its open position, fluid is able to flow downwardly through the seat ring, and hence out of the valve arrangement 10.

Figure 2:
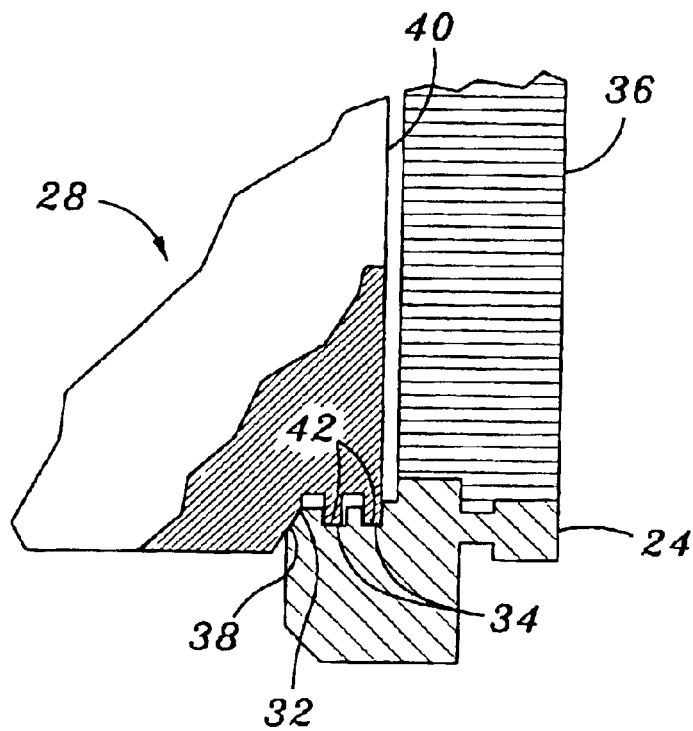
FIG. 2 is a partial cross-sectional view of a valve plug and seat ring arrangement constructed in accordance with a first embodiment of the present invention.

As indicated above, the flow of an abrasive or erosive fluid through the valve cage 36 into the interior thereof as occurs when the valve plug is moved to its open position (i.e., removed from sealed engagement with the seat ring) results in the erosion of the seating surface of the valve plug due to the impingement of the jets which exit the valve cage 36 thereagainst. Referring now to FIG. 2, in the first embodiment of the present invention, the seat ring 24 is configured to define a seating angle or seating surface 32. Formed within the top of the seat ring 24 between the seating surface 32 and that portion engaged to the valve cage 36 is a spaced pair of channels 34. Since the seat ring 24 has an annular configuration, the inner channel 34 of the pair is annular and concentrically positioned within the annular outer channel 34 of the pair.

The valve plug 28 of the first embodiment itself defines a seating angle or seating surface 38 having a configuration which is complementary to that of the seating surface 32 such that the direct engagement of the seating surface 38 to the seating surface 32 (as shown in FIG. 2) creates a fluid-tight seal which facilitates a complete shut-off for the valve arrangement 10. The valve plug 28 further defines an outer surface 40 and a spaced pair of projections 42 which are disposed between the outer surface 40 and the seating surface 38. Since the valve plug 28 is cylindrically configured, the projections 42 are also each annular, with the inner projection 42 of the pair being concentrically positioned within the outer projection 42 of the pair. The outer projection 42 is partially defined by the outer surface 40 of the valve plug 28.

The seat ring 24 and valve plug 28 are oriented relative to each other within the valve arrangement 10 such that when the seating surface 38 of the valve plug 28 is brought into direct engagement with the seating surface 32 of the seat ring 24, the projections 42 defined by the valve plug 28 are received into respective ones of the channels 34. When the seating surface 38 of the valve plug 28 is removed from its sealed engagement to the seating surface 32 of the seat ring 24 (attributable to the movement of the rod 44 in the direction A), a tortuous fluid path is defined between the valve plug 28 and the seat ring 24. In this regard, jets of fluid flowing into the interior of the valve cage 36 are forced to flow about the outer projection 42 and through the outer channel 34, and thereafter about the inner projection 42 and through the inner channel 34 prior to reaching the seating surface 38 of the valve plug 28. Thus, the valve plug 28 and seat ring 24 collectively define a tortuous path wherein the fluid flow is subjected to eight turns prior to reaching the seating surface 38. As will be recognized, this path becomes more tortuous as the valve plug 28 gets closer to its closed position. Flow of fluid through this tortuous path effectively slows down the fluid as it passes over the seating surfaces 32, 38 of the seat ring 24 and valve plug 28, thus reducing erosion.

Also effectively reducing erosion is the placement or positioning of the seating surface 38 of the valve plug 28 further away from the jets exiting the valve cage 36 attributable to the configuration of the valve plug 28. In this regard, since the seating surface 38 is of a smaller diameter as compared to the outer surface 40 of the valve plug 28, plug erosion is reduced since the seating surface 38 is disposed further away (separated radially inwardly from) the jets exiting the valve cage 36.

Figure 3:
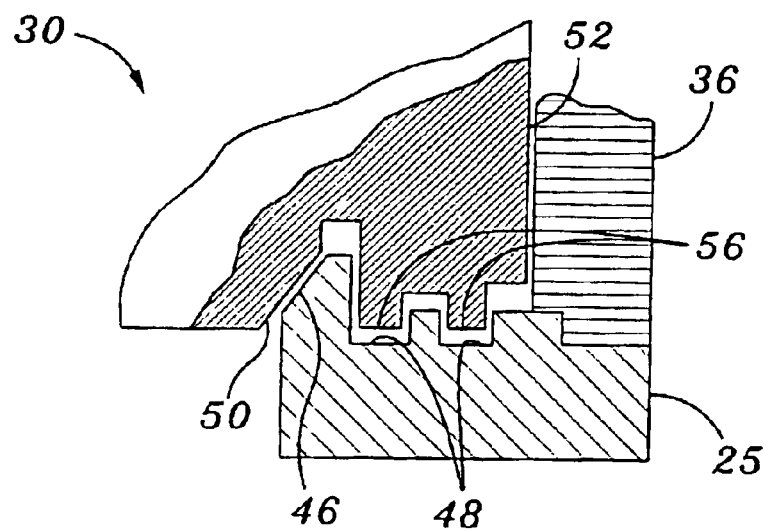
FIG. 3 is a partial cross-sectional view of a valve plug and seat ring arrangement constructed in accordance with a second embodiment of the present invention.

Referring now to FIG. 3, in the second embodiment of the present invention, the seat ring 25 is configured to define a seating angle or seating surface 46. Formed within the top of the seat ring 25 between the seating surface 46 and that portion engaged to the valve cage 36 is a spaced pair of channels 48. Since the seat ring 25 also has an annular configuration, the inner channel 48 of the pair is annular and concentrically positioned within the annular outer channel 48 of the pair.

The valve plug 30 of the second embodiment itself defines a seating angle or seating surface 50 having a configuration which is complementary to that of the seating surface 46 such that the direct engagement of the seating surface 50 to the seating surface 36 creates a fluid-tight seal. The valve plug 30 further defines an outer surface 52 and a spaced pair of projections 56 which are disposed between the outer surface 52 and the seating surface 50. Since the valve plug 30 is also cylindrically configured, the projections 56 are each annular, with the inner projection 56 of the pair being concentrically positioned within the outer projection 56 of the pair.

The seat ring 25 and valve plug 30 are oriented relative to each other within the valve arrangement 10 such that when the seating surface 50 of the valve plug 30 is brought into direct engagement with the seating surface 46 of the seat ring 25, the projections 56 defined by the valve plug 30 are received into respective ones of the channels 48. Thus, when the seating surface 50 of the valve plug 30 is removed from its sealed engagement to the seating surface 46 of the seat ring 25, a tortuous fluid path is defined between the valve plug 30 and the seat ring 25 providing the same functional attributes described above in relation to the valve plug 28 and seat ring 24 of the first embodiment. As shown in FIG. 3, the configuration of the valve plug 30 and seat ring 25 results in the same collectively defining a tortuous path wherein the fluid flow is subjected to ten turns prior to reaching the seating surface 50 of the valve plug 30. This path also becomes more tortuous as the valve plug 30 gets closer to its closed position.

The seat ring 25 and valve plug 30 of the second embodiment have the same basic structural features and hence functional attributes of the seat ring 24 and valve plug 28 of the first embodiment. The valve plug 30 of the second embodiment has the additional attribute of the seating surface 50 thereof being recessed upwardly and behind the main barrel of the valve plug 30, and more particularly the projections 56. As a result, the seating surface 46 of the seat ring 25 is disposed upwardly relative to the channels 48 so as to be engageable to the recessed seating surface 50. In view of these configurations, the fluid jets exiting the valve cage 36 cannot directly impinge the seating surface 50 of the valve plug 30 at all, thus further mitigating erosive effects.

It is contemplated that the seating surfaces 32, 38 in the first embodiment and the seating surfaces 46, 50 of the second embodiment will not be formed at identical angles. In this regard, the engagement of the seating surfaces 32, 38 and the engagement of the seating surfaces 46, 50 may not be surface to surface. Rather, the seating surfaces 38, 50 of the valve plugs 28, 30 will typically be formed to be at a slightly steeper angle than the corresponding seating surfaces 32, 46 of the seat rings 24, 25. As a result, the shut-off seal is a line contact made by the inside edge of the seat rings 24, 25 on the corresponding seating surfaces 38, 50 of the valve plugs 28, 30.

Additional modifications and improvements of the present invention may also be apparent to those of ordinary skill in the art. For example, the seat rings 24, 25 and valve plugs 28, 30 of each embodiment may be configured to collectively define tortuous fluid paths having greater or fewer than eight or ten turns. Thus, the particular combinations of parts described and illustrated herein is intended to represent only certain embodiments of the present invention, and is not intended to serve as limitations of alternative devices within the spirit and scope of the invention.

What is claimed is:

1. A valve arrangement, comprising:

a valve housing defining an interior chamber and a flow opening fluidly communicating with the interior chamber and allowing the fluid to escape the interior chamber;

a seat ring engaged to the valve housing at the flow opening, the seat ring defining a seating surface and a spaced pair of channels positioned between the seating surface and the valve housing; and a valve plug axially slidable within the interior chamber and defining a valve plug seating surface and an outer surface, the valve plug seating surface being complementary to the seat ring seating surface such that direct engagement of the valve plug seating surface thereagainst creates a fluid-tight surface-to-surface seal, the valve plug further defining a spaced pair of projections positioned between the valve plug seating surface and the outer surface, the projections being sized and configured to cooperate with respective ones of the channels in a manner wherein the projections and the channels collectively define a tortuous fluid path for reducing the velocity of the fluid flowing toward the valve plug seating surface when disengaged from the seat ring seating surface.

2. The valve arrangement of claim 1 wherein:

the seat ring has an annular configuration;

the valve plug has a cylindrical configuration;

each of the channels has an annular configuration and is concentrically positioned between the seating surface and the valve housing; and each of the projections has an annular configuration and is concentrically positioned between the valve plug seating surface and the outer surface.

3. The valve arrangement of claim 2 further comprising:

an annular sleeve concentrically disposed within the interior chamber; and an annular valve cage captured between the sleeve and the seat ring, the valve cage defining fluid passageways configured for reducing the pressure of the fluid flowing therethrough from the interior chamber;

the channels being concentrically positioned between the seat ring seating surface and the valve cage.

4. The valve arrangement of claim 1 wherein the channels and the projections are each configured such that the tortuous fluid path defines eight substantially right-angled turns.

5. The valve arrangement of claim 1 wherein the seat ring seating surface and the valve plug seating surface are formed at complementary angles.

6. The valve arrangement of claim 5 wherein the seat ring seating surface and the valve plug seating surface are formed at unequal angles such that the fluid-tight seal includes an edge-to-surface seal.

7. The valve arrangement of claim 1 wherein:

the valve plug seating surface is recessed upwardly into the valve plug relative to the channels; and the seat ring seating surface is disposed upwardly in an orientation complementary to the valve plug seating surface so as to be engageable thereto;

the upwardly disposed seating surfaces preventing direct impingement of the fluid against the valve plug seating surface.

8. The valve arrangement of claim 1 wherein the outer surface of the valve plug partially defines an outer projection of the pair.

9. The valve arrangement of claim 8 wherein:

the outer projection of the pair is spaced inwardly from the outer surface; and the projections cooperate with respective ones of the channels such that disengagement of the valve plug seating surface from the seat ring seating surface results in the tortuous fluid path defining ten substantially right-angle turns.

10. The valve arrangement of claim 1 wherein:

the seat ring defines at least three annular concentric channels positioned between the seating surface and the valve housing;

the valve plug defines at least three annular concentric projections positioned between the valve plug seating surface and the outer surface; and the projections cooperate with respective ones of the channels such that disengagement of the valve plug seating surface from the seat ring seating surface defines the tortuous fluid path.

11. The valve arrangement of claim 10 wherein the channels and the projections are each configured such that the tortuous fluid path defines at least twelve substantially right-angled turns.

* * * * *